E. J. YOUNG.
GRINDER FOR ENSILAGE CUTTER AND OTHER KNIVES.
APPLICATION FILED DEC. 2, 1909.

971,873.

Patented Oct. 4, 1910.
4 SHEETS—SHEET 1.

Witnesses:
Cicero J. Paine
Harry K. Benham

Inventor:
Ernest John Young,
By Frank R. Rathbun
Attorney.

E. J. YOUNG.
GRINDER FOR ENSILAGE CUTTER AND OTHER KNIVES.
APPLICATION FILED DEC. 2, 1909.

971,873.

Patented Oct. 4, 1910.
4 SHEETS—SHEET 2.

Witnesses:
Cicero J. Tame
Harry K. Benham

Inventor:
Ernest John Young
By Frank R. Rathbun
Attorney.

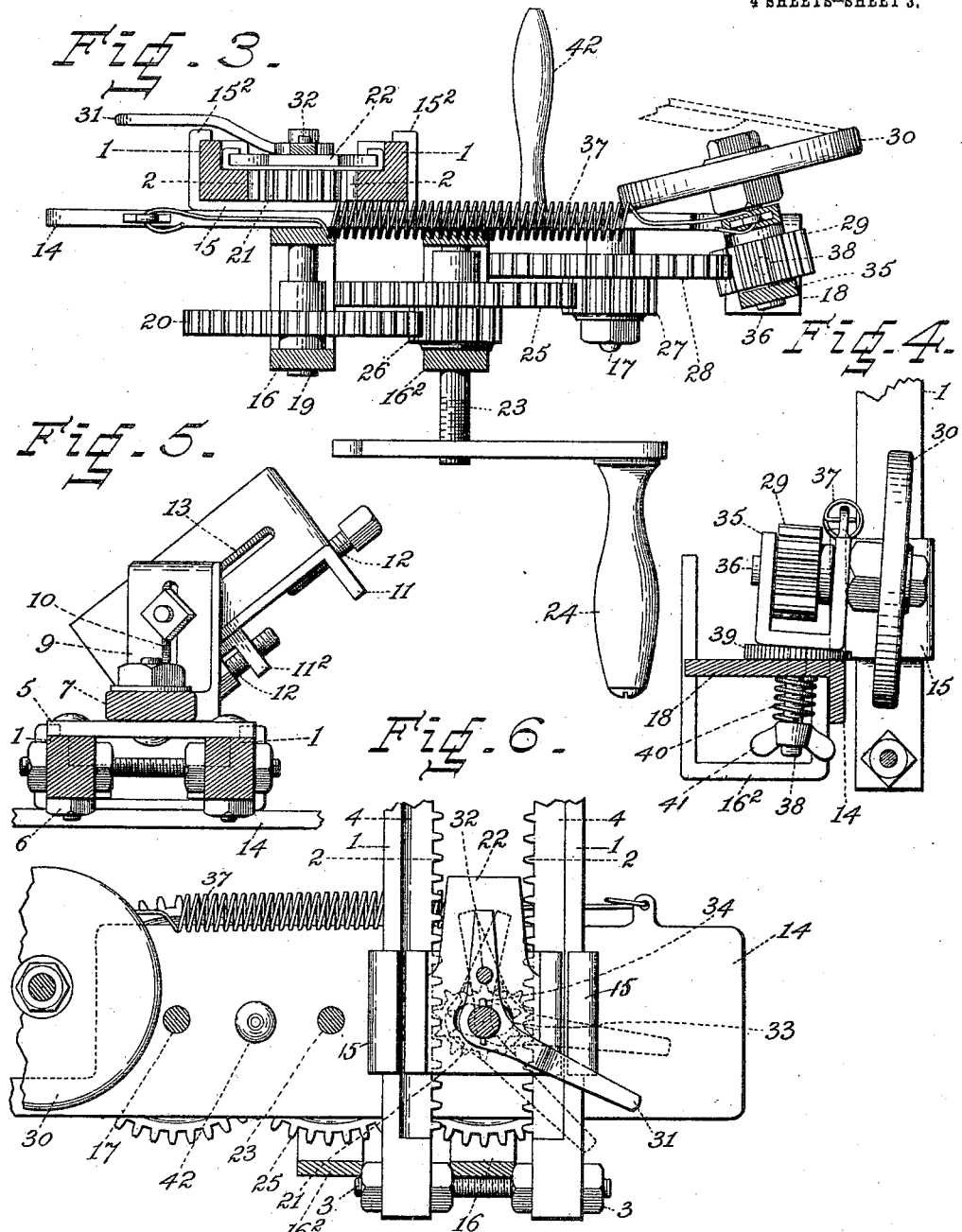

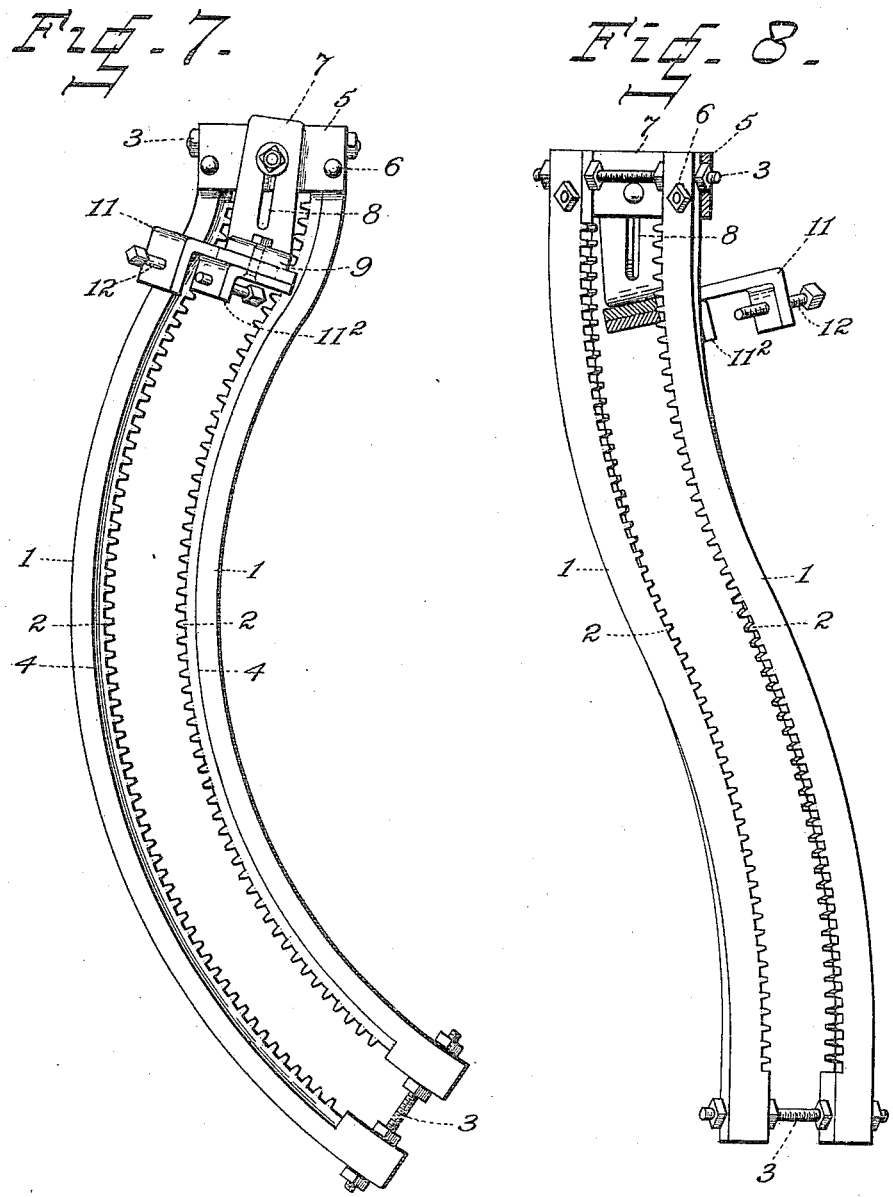

UNITED STATES PATENT OFFICE.

ERNEST JOHN YOUNG, OF FLEMING, NEW YORK.

GRINDER FOR ENSILAGE-CUTTER AND OTHER KNIVES.

971,873.  Specification of Letters Patent.  Patented Oct. 4, 1910.

Application filed December 2, 1909. Serial No. 531,075.

*To all whom it may concern:*

Be it known that I, ERNEST JOHN YOUNG, a citizen of the United States, residing at Fleming, in the county of Cayuga and State of New York, have invented certain new and useful Improvements in Grinders for Ensilage-Cutter and other Knives, of which the following is a specification.

My invention has for one object the grinding of ensilage cutter knives without removing them from the wheel or cylinder on which they may be fastened and carried, thus eliminating a possibility of imperfect readjustment and refastening thereon that might result from the knives being detached for the purpose of grinding.

Another object is to provide a grinding or abrasive wheel that shall be self-adjusting or flexible to the beveled cutting edge of the knife thus preserving to the greatest possible degree its primal bevel throughout its cutting length; and still another object of the invention is to render it practicable to grind ensilage cutter knives of varying shapes as to their cutting contour with equal facility as to grind those having a straight cutting edge.

I attain the above objects by the arrangement of parts shown in the accompanying drawings on four sheets forming a part of this specification in which—

Figure 1:
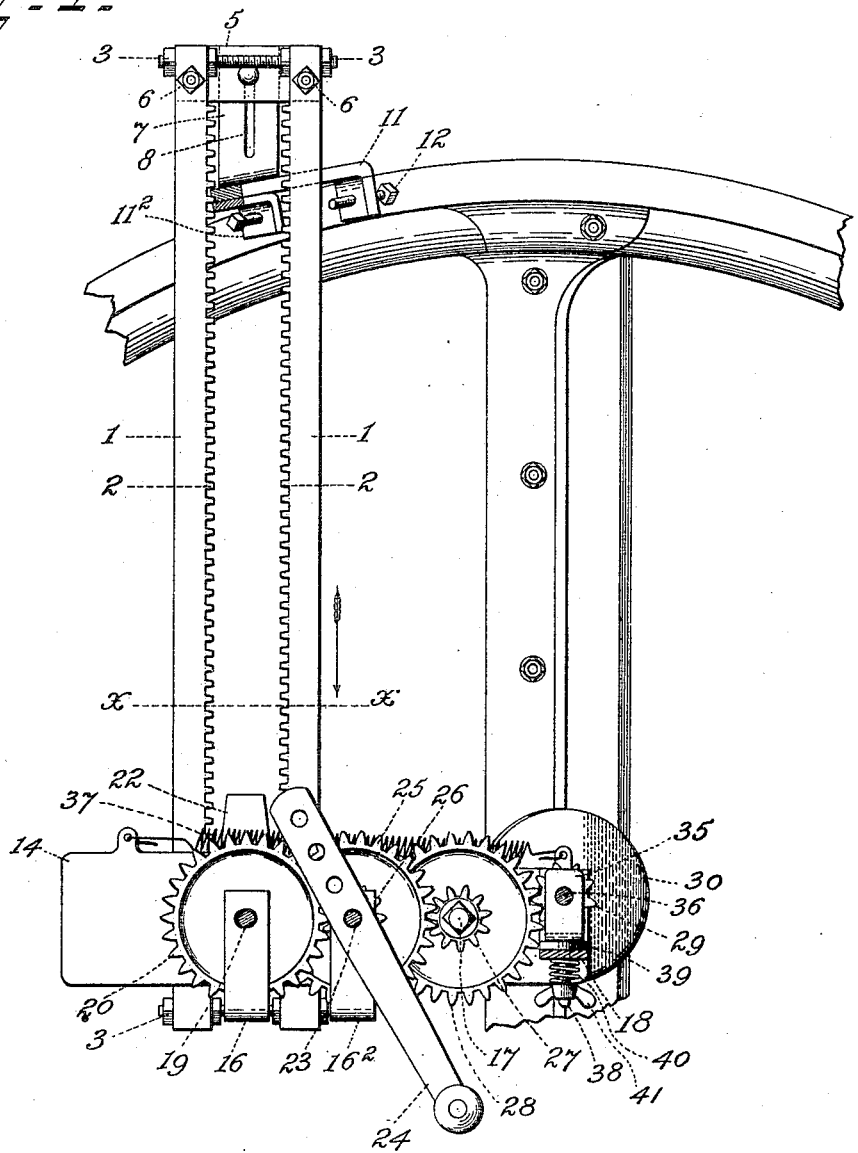
Figure 2:
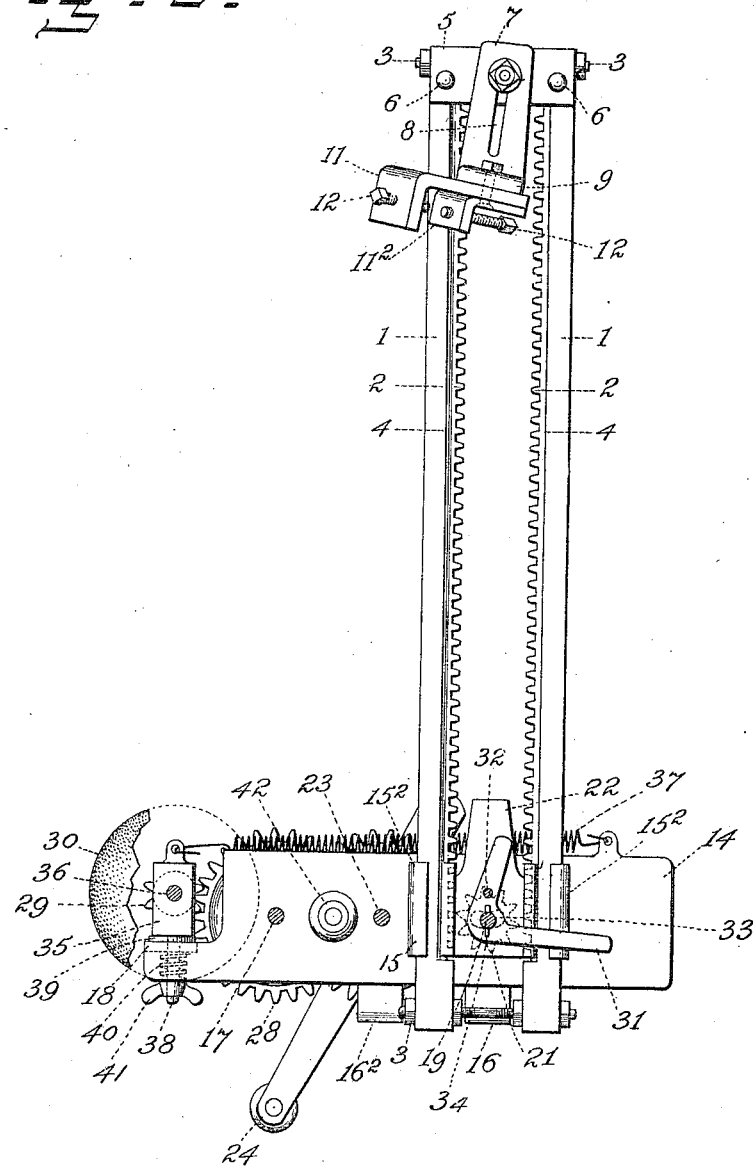

Figure 1 is a front or driving side elevation of the grinder showing it fastened to the rim of a broken-away section of a cutter wheel approximately in a position ready for grinding on a straight edged knife fastened in working place in the said wheel. Fig. 2 is a rear side elevation of the grinder. Fig. 3 is a plan view of the grinder taken on the sectional dotted line *x—x* of Fig. 2 looking in the direction of the arrow and drawn to an enlarged scale. Fig. 4 is an end view of the flexible abrasive wheel mounted on a shaft carried in its pivoted box. Fig. 5 is a top view of the fastening or clamping end of the grinder guides. Fig. 6 is an enlarged view of the parts at the lower end of Fig. 2. Fig. 7 is a view showing the form of the guide-pieces of the grinder when desired for the grinding of a knife having a curved contour edge, and:—Fig. 8 is a view showing the form of the guide-pieces of the grinder when it is found desirable to grind a recurved or slightly winding knife.

Similar reference figures refer to similar parts in the several views.

In Figs. 1 and 2 are shown two guide-pieces 1, 1, provided on their inner sides with rack teeth 2, 2. The said guide-pieces 1, 1, are retained in desired relative position by bolts and nuts 3, 3, passing through their top and bottom ends. Each of the guide-pieces 1, 1, is provided on its rearward side with a way 4, and their top ends are further provided, on the rearward side, with a cross-piece or cleat 5, secured in place by bolts and nuts 6, 6. To the outer side of the said cleat 5, is bolted an iron 7, having a slot 8, and a foot 9, turned therefrom at a right angle outwardly and at an acute angle transversely which also is provided with a slot 10, seen in Fig. 5. On the bottom side of said foot 9, is carried a pair of clamping pieces 11, 11², each being furnished with a clamping bolt 12, 12. The clamping piece 11, is provided with a slot 13.

At the front of the guide-pieces 1, 1, is provided a supporting piece 14, having on the side next to the said guide pieces a retaining piece 15, the ends of which are turned up and over on the outer sides of the guide-pieces 1, 1, in the manner seen at 15², in Figs. 2, 3, and 6, thus permitting the said supporting piece 14, and its several connected parts hereinafter described to be positively moved along said guide pieces from end to end in either direction the purpose for which will presently be seen. In a suitable position on the front side of the supporting piece 14, bearing pieces 16, 16², are arranged and also a stud-pin or shaft 17. The outer end of the supporting piece 14, is forwardly turned into a shelf 18, at right angles thereto as seen in Figs. 3, and 4. The bearing piece 16, supports a shaft 19, which carries a gear wheel 20, near the front end. The said shaft 19, is rearwardly extended through the supporting piece 14, and centrally between the guide-pieces 1, 1, at which point it carries a rock-pinion 21. Thence it is extended through a way piece 22, which is arranged to slide on the ways 4, of the guide-pieces 1, 1, the purpose for which arrangement of parts will presently be seen. The bearing piece 16² supports a shaft 23, which is forwardly extended and provided at its end with a hand crank 24, and further carries a gear-wheel 25, and a pinion 26, which latter meshes with the gear wheel 20, the rear end of said shaft is extended through and supported by the supporting piece 14. The stud pin or shaft 17, is properly fixed in place on the supporting piece 14, as shown, and carries a pinion 27, near its forward end that meshes with the gear-wheel 25, and also a gear wheel 28, that meshes with a pinion 29, which drives the abrasive wheel 30 hereinafter described. The way-piece 22, see Fig. 6, arranged to be moved with the other connected parts on the guides 1, 1, as already mentioned, is carried near the rear end of the shaft 19, where it is provided with a switch 31, which loosely rides on the shaft 19, and is pivoted vertically above the same to the said way piece at the point 32. The lower end of the switch 31, is outwardly extended so it may conveniently be operated and without interference with adjacent parts. The said way-piece 22, at the point where the shaft 19, passes, has a curved slot 33, the radius of which is centered in the pivoted point 32, mentioned. By this arrangement the operator is enabled to throw the shaft, at this point, from one end of the curved slot 33, to the other end causing the rack-pinion 21, carried on said shaft to mesh with either of the racks 2, of the guide pieces 1, 1, or to keep the same unmeshed from either as he desires, said motions being shown in the dotted lines in Fig. 6. The rear end of the shaft 19, is loosely carried in its bearing in the bearing piece 16, so it may not bind, and a pin 34, passed through the shaft 19, outside of the switch 31, serves to retain the several parts described in working place.

Referring to Fig. 6: On the forwardly turned shelf 18, of the supporting piece 14, is carried a box 35, carrying a shaft 36, on which is fixed the pinion 29. Rearwardly on the said shaft 36, is carried the abrasive wheel 30, in a position which shall be most effective for grinding. An eye-piece on the rear side of the box 35, connects one end of a spiral spring 37, with a similar eye piece on the opposite end of the supporting piece 14. On the bottom side of the box 35, is provided a pivot-post 38, that passes through a wedge-shaped washer 39, having a milled edge, and the forwardly extended shelf 18, the pivot-post being lengthened enough below said shelf to carry a tension spring 40, and a thumb nut 41, the object of which arrangement of parts will presently be explained. At a convenient point on the rear side of the supporting piece 14, is provided a handle 42, which serves for the convenient moving of the supporting piece and its connections along the guide-pieces during the process of grinding the knife.

In Figs. 7 and 8 are shown guide pieces of modified form for knives of a curved or recurved type respectively. In all respects excepting shape they are identical with, and adapted to, the same functions as are the straight guide pieces 1, 1, already described.

Having thus described in detail the several parts composing my invention, I will now set forth the operation of the same. When desired to grind a knife of straight pattern carried in a cutter wheel such as is partially shown in Fig. 1, and without removing the same therefrom, the guide-pieces are clamped to the rim of the cutter wheel by the clamping pieces 11, 11$^2$, and their clamping screws, carried under the foot 9, the slots in said foot the clamping piece 11, and in the piece 7, affording a wide latitude for relative adjustment of the guides and connected parts on varying kinds and sizes of cutting machines. In its normal position the abrasive wheel takes the position seen in Fig. 3, its edge resting on the rear side of the supporting piece 14, through the tension of the spiral spring 37, connected with the pivoted box carrying the shaft on which the abrasive wheel is secured. In the clamping and fastening of the guides on the rim of the cutter wheel the outer side of the abrasive wheel is brought to bear against the bevel of the knife the force of such contact being in proportion to the strength of the spiral spring which at all times keeps it in close relation therewith and with whatever inequalities may exist thereon. In Figs. 1 and 3, the position is plainly shown, where the process of grinding may begin on the knife from the point nearest the center of the cutter wheel on which it is fastened, if so desired.

The operator turning the driving crank 24, on the shaft 23, causes the abrasive wheel to rapidly rotate through the prearranged speeding of the gear-train as has been described. At the same time the rack-pinion 21, on the shaft 19, is caused to turn at a low speed through its gear train connection, and on being thrown into mesh, through the action of the switch 31, with the proper rack-teeth of one of the guide pieces, the supporting piece 14, and its connected parts are upwardly carried on the guide-pieces, the abrasive wheel meanwhile performing its office of grinding on the knife. When the end of the knife has been reached, the rack pinion mentioned, through the switch, is thrown over and in mesh with the rack teeth of the other or opposite guide-piece, and a reverse or downward movement of the supporting piece and its connected parts results and, thus alternating, the operations can be repeated as often as deemed necessary for the proper sharpening of the knife fastened in the cutter wheel.

During the entire process the abrasive wheel has been kept in absolute and unvarying contact with the bevel of the knife. Should it be found desirable while grinding to slightly change the vertical relation of the grinding side of the abrasive wheel to the bevel of the knife, the action may be accomplished by turning the milled-edge and wedge-shaped washer 39, between the pivoted box and the supporting shelf until the desired angle is assured when, by tightening the tension spring 40, through the thumb nut 41, on the post of the pivoted box the relation is maintained without having to change or regulate the clamping pieces holding the guides of the grinder on the cutter wheel. Like changes also could be made when guides of the type shown in Figs. 7, and 8, are required for grinding curved or other shaped knives.

Having thus described the several parts comprising my invention and their operation, what I claim as new and desire to secure by Letters Patent of the United States of America is:

1. In a grinder for ensilage cutter and other knives, equidistant guides conforming to the contour of the cutting edge of the knife, closed at their ends, having adjustable clamping pieces on one end and a supporting piece adapted to move thereon from one end to the other end and supporting an abrasive wheel mounted on a shaft carried on a pivoted box and means for rotating the same substantially as described.

2. In a grinder for ensilage cutter and other knives, equidistant guides conforming to the contour of the cutting edge of the knife, closed at their ends, having adjustable clamping pieces on one end and a supporting piece having a retaining piece on one side and a shelf at one end, an abrasive wheel mounted on a shaft carried on a pivoted box on said shelf, means between said pivoted box and said shelf for vertically adjusting the side plane of said abrasive wheel and assuring such adjustment, and means for rotating said abrasive wheel, substantially constructed in the manner and for the purpose herein described.

3. In a grinder for ensilage cutter and other knives equidistant guides conforming to the contour of the cutting edge of the knife, closed at their ends, having adjustable clamping pieces at one end, ways on one side thereof and rack teeth on their inner edges combined with a supporting piece provided with a retaining piece and moving on said guides from one end to the other end thereof, and having a shelf at one end, an abrasive wheel mounted rearwardly of said supporting piece on a shaft carried by a pivoted box on said shelf, a rotatable wedge between the bottom of said pivoted box and said shelf adapted to vertically adjust the side plane of said abrasive wheel and means for assuring said adjustment, means between the side of said pivoted box next to the abrasive wheel and a suitable point on said supporting piece for assuring the yieldable action of said abrasive wheel, and a train of wheels for rotating said abrasive wheel and a pinion carried on a shaft midway and between said guides, and a way-piece in the ways of the guides having a curved slot and a switch pivoted thereon above said curved slot adapted to throw said shaft of said pinion from one end of said slot to the other end and engaging said pinion with said teeth of said guides substantially constructed and arranged in the manner and for the purpose herein described and set forth.

4. In a grinder for ensilage cutter and other knives equidistant guides conformable to the contour of the cutting edge of the knife, closed at their ends, one end provided with adjustable clamping pieces, ways on their rearward side and rack-teeth on their inner edges combined with a supporting piece having a retaining piece adapted for its passing on the front side of said guides from end to end, and having a shelf at one end; an abrasive wheel rearwardly mounted from said supporting piece on a shaft carried in a box having a pivot post on its bottom side passing through said shelf and adapted to turn therein, and a rotatable wedge on said pivot post between the bottom of said box and the surface of said shelf, a tension-spring and a thumb-nut on said pivot-post below said shelf, a spiral spring between the abrasive wheel side of said box and a convenient point on said supporting piece; a suitable train of wheels adapted to rotate said abrasive wheel, and a pinion carried on a shaft passing midway between the toothed sides of said guides and through a curved slot in a way piece in said ways of said guides provided with a switch pivoted thereon above said slot and adapted to control said shaft with its pinion substantially in the manner and for the purpose herein described and set forth.

In testimony whereof I affix my signature, in presence of two witnesses.

ERNEST JOHN YOUNG.

Witnesses:
 FRANK R. RATHBUN,
 WM. O. AXTMANN.